(12) United States Patent
Oya et al.

(10) Patent No.: US 12,134,346 B2
(45) Date of Patent: Nov. 5, 2024

(54) RAMP SYSTEM

(71) Applicant: TOYOTA JIDOSHA KABUSHIKI KAISHA, Toyota (JP)

(72) Inventors: Kentaro Oya, Toyota (JP); Hiroyuki Gotoh, Anjo (JP); Kazuki Osada, Toyota (JP); Naoya Ishida, Kariya (JP); Chihiro Date, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 322 days.

(21) Appl. No.: 17/673,900

(22) Filed: Feb. 17, 2022

(65) Prior Publication Data

US 2022/0305977 A1    Sep. 29, 2022

(30) Foreign Application Priority Data

Mar. 25, 2021 (JP) .................. 2021-052238

(51) Int. Cl.
| | | |
|---|---|---|
| *B60Q 1/50* | (2006.01) | |
| *A61G 3/06* | (2006.01) | |
| *B60G 9/00* | (2006.01) | |
| *B60P 1/43* | (2006.01) | |
| *E05F 15/00* | (2015.01) | |
| *E05F 15/73* | (2015.01) | |
| *B60Q 9/00* | (2006.01) | |
| *B60R 3/00* | (2006.01) | |

(52) U.S. Cl.
CPC .............. *B60Q 1/50* (2013.01); *A61G 3/061* (2013.01); *B60G 9/00* (2013.01); *E05F 15/00* (2013.01); *E05F 15/73* (2015.01); *B60P 1/431* (2013.01); *E05Y 2201/43* (2013.01); *E05Y 2400/44* (2013.01); *E05Y 2900/531* (2013.01)

(58) Field of Classification Search
None
See application file for complete search history.

(56) References Cited

U.S. PATENT DOCUMENTS

| | | | |
|---|---|---|---|
| 2011/0071684 A1* | 3/2011 | Holmberg | B63B 27/143 14/71.3 |
| 2017/0057519 A1* | 3/2017 | Ungetheim | A61G 3/061 |
| 2019/0265703 A1* | 8/2019 | Hicok | G05D 1/249 |
| 2020/0262326 A1 | 8/2020 | Honda et al. | |
| 2020/0406751 A1 | 12/2020 | Ide et al. | |

(Continued)

FOREIGN PATENT DOCUMENTS

| | | |
|---|---|---|
| JP | H11-236783 A | 8/1999 |
| JP | H11-350833 A | 12/1999 |

(Continued)

*Primary Examiner* — Aniss Chad
*Assistant Examiner* — Madison R. Inserra
(74) *Attorney, Agent, or Firm* — Oliff PLC

(57) ABSTRACT

A ramp system includes: a ramp main body provided in a door opening and configured to be able to advance from a vehicle floor toward a road surface; a ramp-state detection device configured to detect an advancing-retracting state of the ramp main body; a display device configured to display an image in a display area observable from an operator seat; and a user interface (UI) controller configured to control display on the display device. The UI controller causes the display device to display a state image including an image indicative of the advancing-retracting state.

6 Claims, 10 Drawing Sheets

(56) References Cited

U.S. PATENT DOCUMENTS

| | | | |
|---|---|---|---|
| 2020/0406923 A1 | 12/2020 | Ide et al. | |
| 2021/0155264 A1* | 5/2021 | MacPherson | ............ A61G 3/065 |
| 2022/0249306 A1* | 8/2022 | Carmichael | ............ A61G 3/0808 |

FOREIGN PATENT DOCUMENTS

| | | | | |
|---|---|---|---|---|
| JP | 2008-202239 A | 9/2008 | | |
| JP | 2009-101959 A | 5/2009 | | |
| JP | 2014-169051 A | 9/2014 | | |
| JP | 2020-131784 A | 8/2020 | | |
| JP | 2021-008139 A | 1/2021 | | |
| JP | 2021-009432 A | 1/2021 | | |
| WO | WO-2019017845 A1 * | 1/2019 | ............. | A61G 3/061 |

* cited by examiner

RAMP SYSTEM

CROSS-REFERENCE TO RELATED APPLICATION

This application claims priority to Japanese Patent Application No. 2021-052238 filed on Mar. 25, 2021, incorporated herein by reference in its entirety.

BACKGROUND

1. Technical Field

The present specification describes a ramp system including a ramp main body in a door opening, the ramp main body being able to advance from a vehicle floor to a road surface.

2. Description of Related Art

In the related art, it has been proposed to provide a vehicle with a ramp extending from a vehicle floor to a road surface in a door opening in order to assist a wheelchair user to get on the vehicle and get off the vehicle. Japanese Unexamined Patent Application Publication No. 2014-169051 (JP 2014-169051 A) describes a vehicle provided with a ramp configured to electrically advance and retract. In JP 2014-169051 A, an indicator indicative of a state of the ramp (e.g., whether the ramp makes contact with the ground or not) is provided on a side face of the ramp. Based on the indicator, a wheelchair user or a caregiver grasps the state of the ramp, eventually, whether the wheelchair user may start to get on or off the vehicle.

SUMMARY

In the meantime, an operator who manages the operation of the vehicle stays in the vehicle. It is necessary for the operator to confirm that the ramp is accommodated before the vehicle starts to move. However, in the technology of JP 2014-169051 A, the indicator indicative of the state of the ramp is provided only in the ramp itself. On that account, in the technology of JP 2014-169051 A, it is necessary for the operator to check with eyes the ramp by greatly changing the direction of the body as necessary. Further, depending on the positional relationship between an operator seat and the door opening, it might be difficult to grasp an advancing-retracting state of the ramp from the operator seat. Particularly, in a case where a door is closed, it is difficult to grasp from the operator seat whether or not the ramp is deployed outside the door. As a result, in the conventional technologies such as JP 2014-169051 A, it is necessary for the operator to move to near the door opening to check the state of the ramp before the vehicle starts to move. However, it is very troublesome for the operator to change the direction of the body or to move on foot to check the state of the ramp.

In view of this, the present specification describes a ramp system that allows an operator to grasp an advancing-retracting state of a ramp more easily.

A ramp system described in the present specification includes a ramp main body, a ramp-state detection device, a display device, and a user interface (UI) controller. The ramp main body is provided in a door opening and configured to be able to advance from a vehicle floor toward a road surface. The ramp-state detection device is configured to detect an advancing-retracting state of the ramp main body. The display device is configured to display an image in a display area observable from an operator seat. The UI controller is configured to control display on the display device. The UI controller causes the display device to display a state image including an image indicative of the advancing-retracting state.

With such a configuration, an operator can grasp the advancing-retracting state of the ramp main body without changing the direction of the body or moving.

In this case, the UI controller may cause the state image to be displayed on the same screen as a change button to be selected by an operator when a vehicle is changed from a stop state to a traveling state. With such a configuration, when the operator operates the change button, the state image easily naturally gets in the visual field of the operator. As a result, it is possible to effectively prevent lack of check, that is, it is possible to effectively prevent the operator from start to move the vehicle without checking the advancing-retracting state of the ramp main body.

Further, the ramp system may further include a door-state detection device configured to detect an opening-closing state of a door main body configured to be able to be opened and closed close cover the door opening, and the state image may further include an image indicative of the opening-closing state.

With such a configuration, the operator can also easily grasp the opening-closing state of the door main body.

In this case, the state image may include respective schematic views of the vehicle, the ramp main body, and the door main body viewed from the upper side.

With such a configuration, the operator can grasp the states of the ramp main body and the door main body intuitively and quickly.

Further, the ramp-state detection device may include a rotation number sensor configured to detect a rotation number of a ramp motor as a power source configured to advance and retract the ramp main body. The ramp-state detection device may determine the advancing-retracting state based on the detected rotation number.

With such a configuration, it is possible to accurately detect the advancing-retracting state of the ramp main body.

In this case, the ramp-state detection device may also detect presence or absence of a malfunction in the ramp main body. When the malfunction occurs, the state image may include a warning image indicating that the malfunction occurs.

With such a configuration, the operator can grasp whether the ramp main body has a malfunction or not at an early stage, so that the operator can take measures for the malfunction at an early stage.

In this case, the ramp-state detection device may include: a rotation number sensor configured to detect a rotation number of a ramp motor as a power source configured to advance and retract the ramp main body; a current sensor configured to detect an applied current value in the ramp motor, and a position switch configured to detect the ramp main body reaching a predetermined position. The ramp-state detection device may determine whether the malfunction occurs in the ramp main body or not, based on a detection value from the current sensor and a comparison result obtained by comparison between a position of the ramp main body that is estimated from an ON-OFF state of the position switch and a position of the ramp main body that is estimated from the rotation number.

With such a configuration, it is possible to surely detect presence or absence of the malfunction.

In this case, the ramp system may further include a ramp switch provided at a position closer to the door opening than the operator seat, the ramp switch being configured to receive an instruction of deployment or accommodation of the ramp main body and to be invalidated under a specific condition. In a case where the ramp switch is invalidated, the state image may include an invalidation image indicating that the ramp switch is invalidated.

By displaying the invalidation image, the operator can recognize that the ramp switch is invalidated, eventually, that the ramp main body does not move against the will of the operator, so that the operator can focus on other operations at ease.

Further, the ramp system may further include a speaker configured to output sound toward the operator seat, and the UI controller may output sound corresponding to the ramp state from the speaker while the state image is displayed.

With such a configuration, the operator can more surely grasp the state of the ramp main body.

With the ramp system described in the present specification, the operator can more easily grasp the advancing-retracting state of a ramp.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
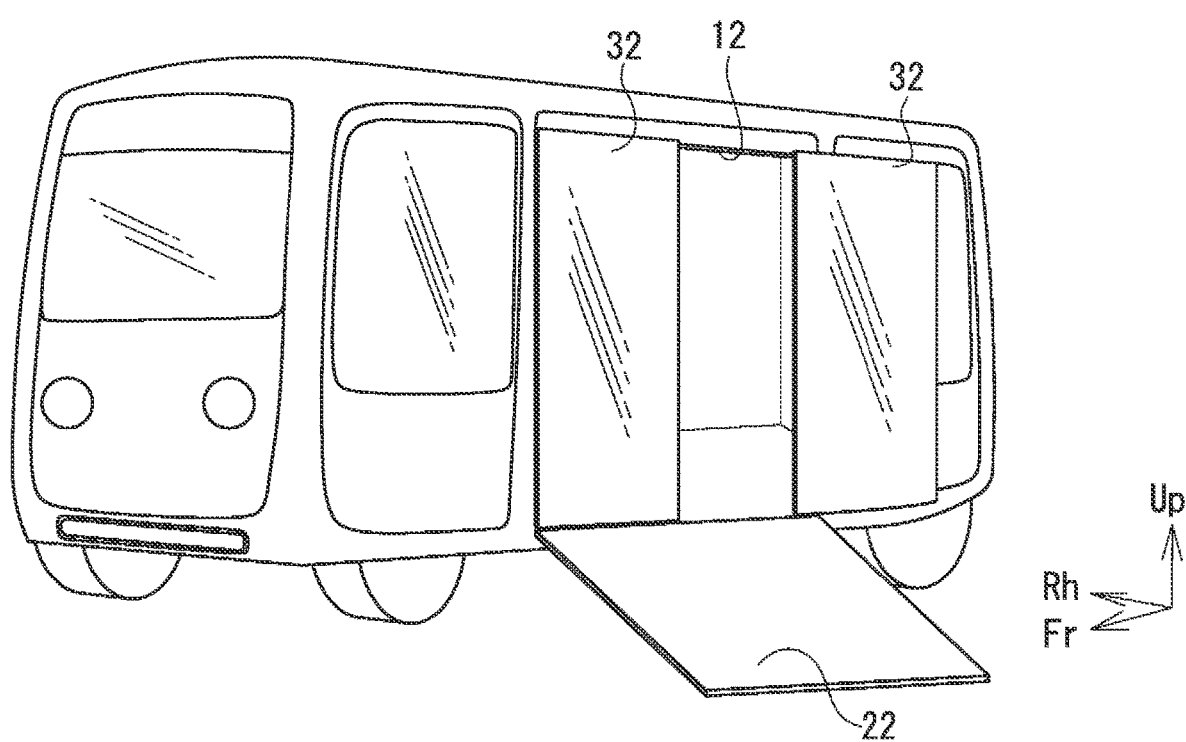
FIG. 1 is a perspective view of a vehicle provided with a ramp system.
Figure 2:
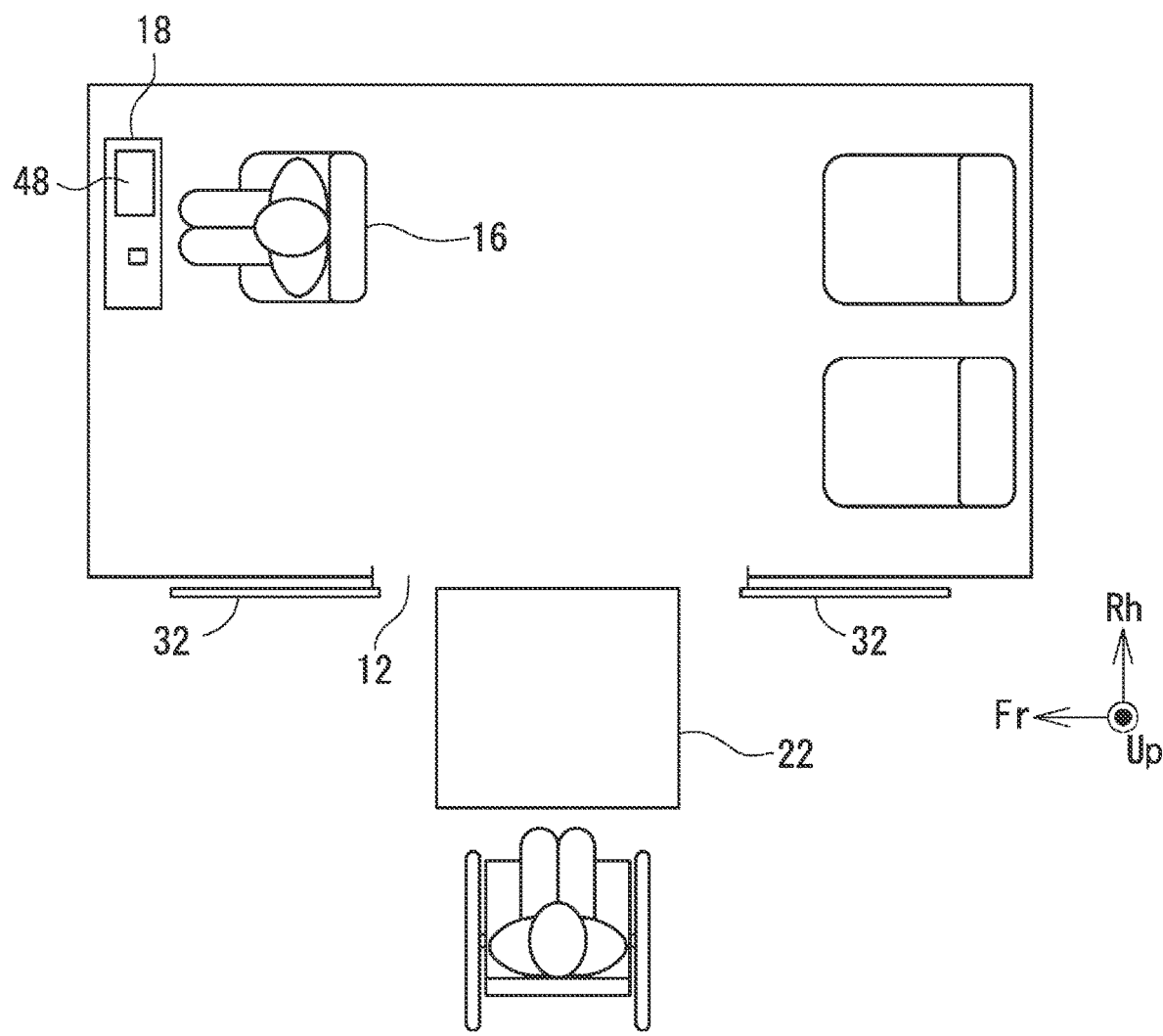
FIG. 2 is a schematic view of a vehicle cabin viewed from right above the vehicle cabin.

The following describes a configuration of a ramp system 10 with reference to the drawings. FIG. 1 is a perspective view of a vehicle provided with the ramp system 10, and FIG. 2 is a schematic view illustrating a vehicle cabin viewed from right above the vehicle cabin.

The vehicle is a shared vehicle that unspecified passengers get on and off. The vehicle is, for example, a bus configured to travel along a route determined in advance and to sop at specific stops. The vehicle in the present embodiment has a self-driving function that causes the vehicle to perform all dynamic driving tasks. Here, "self-driving" means any of Levels 3 to 5 determined by Society of Automotive Engineers, Inc. (SAE), for example. Level 3 is a drive mode in which all dynamic driving tasks are automated in specific places such as highways but a driver's operation is required in emergency. Further, Level 4 is a drive mode in which all dynamic driving tasks are automated only in specific places and measures for emergency situations are automatically processed. Level 5 is a drive mode in which self-driving is performable under almost all conditions without any limitation for places or the like, and Level 5 means so-called "fully autonomous driving." Note that an "operator" in the following description represents a person staying in the vehicle to provide various instructions to the vehicle.

As illustrated in FIG. 1, the vehicle does not include a bonnet and a trunk, and the vehicle has an outer shape having a generally box shape (rectangular-solid shape) the front end surface and the rear end surface of which stand generally vertically. A door opening 12 via which an occupant gets on and off the vehicle is formed on a side face of the vehicle. The door opening 12 is able to be opened and closed by being covered with a door main body 32. The door main body 32 in the present embodiment is a slide door configured to slide in the front-rear direction along a side wall of the vehicle to open and close the door opening 12. Note that the configuration of the door main body 32 is not limited in particular, provided that the door main body 32 can cover the door opening 12 to be able to be opened and closed. Accordingly, the door main body 32 may be a folding door, a swing door, or a flap door.

The vehicle is further provided with a ramp main body 22 configured to assist a wheelchair user to get on and off the vehicle. The ramp main body 22 is changeable between an accommodated state and a deployed state. FIGS. 1, 2 illustrate the ramp main body 22 in the deployed state. In the deployed state, the ramp main body 22 extends toward a road surface from a bottom end of the door opening 12, eventually, a vehicle floor, and a tail end of the ramp main body 22 makes contact with the road surface. In the accommodated state, the ramp main body 22 is accommodated in an underfloor space under the vehicle floor. In the course of changing from the accommodated state to the deployed state or from the deployed state to the accommodated state, a ramp actuator 24 (see FIG. 3) moves the ramp main body 22. In the following description, a state of the ramp main body 22 moving to change from the accommodated state to the deployed state or from the deployed state to the accommodated state is referred to as a "transition state."

As illustrated in FIG. 2, an operator seat 16 on which the operator is to be seated is provided in a front part of the vehicle. The operator seat 16 is provided to face forward in the vehicle front-rear direction. An operation panel 18 is placed in front of the operator seat 16. The operation panel 18 receives an operating instruction from the operator and also provides information to the operator by use of a display device 48.

Figure 3:
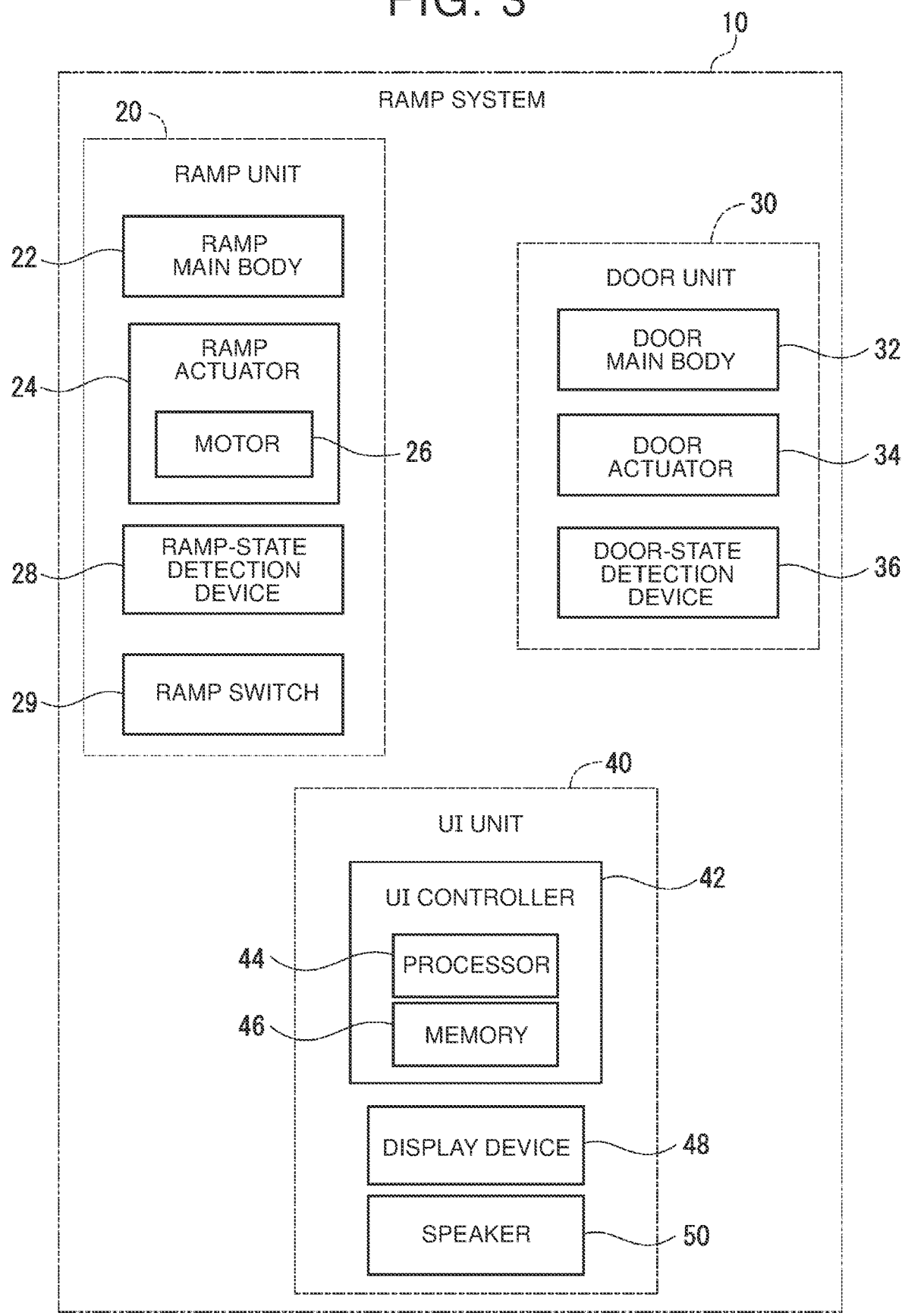
FIG. 3 is a block diagram illustrating a configuration of the ramp system.

Next will be described the ramp system 10 provided in the vehicle. FIG. 3 is a block diagram illustrating the configuration of the ramp system 10. As illustrated in FIG. 3, the ramp system 10 includes a ramp unit 20, a door unit 30, and a UI unit 40.

The ramp unit 20 is a unit configured to advance and retract the ramp main body 22 and includes a ramp main body 22, a ramp actuator 24, a ramp-state detection device 28, and a ramp switch 29. As described above, the ramp main body 22 is a plate material changeable to the deployed state in which the ramp main body 22 is extends from the vehicle floor toward the road surface, the accommodated state in which the ramp main body 22 is accommodated in the underfloor space of the vehicle, and the transition state in which the ramp main body 22 is moving to change to the accommodated state or the deployed state.

The ramp actuator 24 is an actuator configured to move the ramp main body 22. A configuration of the ramp actuator 24 is not limited in particular. For example, the ramp actuator 24 includes a motor 26 as a power source, and a transmission mechanism (e.g., a gear, a pulley, or the like) configured to transmit an output torque from the motor 26 to the ramp main body 22.

The ramp-state detection device 28 is a device configured to detect the state of the ramp main body 22. A detection result from the ramp-state detection device 28 is transmitted to the UI unit 40 as ramp detection result. The ramp detection result includes at least information indicative of an advancing-retracting state of the ramp main body 22, that is, which state the ramp main body 22 has, the deployed state, the accommodated state, or the transition state. Further, the ramp detection result also includes information indicative of whether the ramp main body 22 has a malfunction or not. Details of a specific configuration of the ramp-state detection device 28 will be described later.

The ramp switch 29 is a switch configured to receive an instruction to deploy or accommodate the ramp main body 22. The ramp switch 29 is provided in the vicinity of the door opening 12, that is, at a position closer to the door opening 12 than the operator seat 16. A passenger can operate the ramp switch 29 as needed. When the ramp switch 29 is operated, the ramp main body is changed from the accommodated state to the deployed state or from the deployed state to the accommodated state.

The door unit 30 is a unit configured to open and close the door main body 32 and includes a door main body 32, a door actuator 34, and a door-state detection device 36. The door main body 32 is a panel part configured to be able to be opened and closed to cover the door opening 12 as described above.

The door actuator 34 is an actuator configured to move the door main body 32 and includes a motor or the like as a power source, for example. The door-state detection device 36 is a device configured to detect an opening-closing state of the door main body 32. The door-state detection device 36 includes, for example, a rotation number sensor configured to detect the rotation number of the motor configured to move the door main body 32, a door sensor configured to output a signal at the time when the door main body 32 is fully opened or fully closed, and so on. The opening-closing state of the door main body 32 that is detected by the door-state detection device 36 is transmitted to the UI unit 40.

The UI unit 40 is a unit configured to output information on the ramp main body 22 to the operator. Note that the UI unit 40 may be provided for exclusive use to output the information on the ramp main body 22, or a general-purpose user interface device provided in the vehicle may be used as the UI unit 40. In the present embodiment, the UI unit 40 is a user interface device configured to output information to the operator and to receive an operating instruction from the operator.

The UI unit 40 includes a UI controller 42, the display device 48, and a speaker 50. The display device 48 displays an image in a display area observable from the operator seat 16. The display device 48 is not limited in particular, provided that an image can be displayed on the display device 48. Accordingly, the display device 48 may be a display configured such that an image is projected on the display device 48 itself, a projector configured to project an image in the display area, or a head-up display configured to project an image in a space or on a transparent plate material. Further, the display device 48 may be a touch panel on which an image is displayed and which detects a touch-input from a user. In the present embodiment, the display device 48 is a touch panel incorporated in the operation panel 18. The speaker 50 is configured to output sound toward the operator seat and is incorporated in the operation panel 18.

The UI controller 42 controls the display on the display device 48 and the sound output from the speaker 50. The UI controller 42 is physically a computer including a processor 44 and a memory 46. The "computer" also includes a micro controller configured such that a computer system is incorporated in one integrated circuit. Further, the processor 44 indicates a processor in a general meaning and includes a general-purpose processor (e.g., a central processing unit (CPU) or the like) or a single-purpose processor (e.g., a graphics processing unit (GPU), an application specific integrated circuit (ASIC), a field programmable gate array (FPGA), a programmable logical device, or the like). Further, the memory 46 may include at least one of a semiconductor memory (e.g., a RAM, a ROM, a solid-state drive, or the like) and a magnetic disk (e.g., a hard disk drive or the like).

The UI controller 42 displays, on the display device 48, a state image 74 (see FIG. 5) indicative of the state of the ramp main body 22 that is detected by the ramp-state detection device 28 and the opening-closing state of the door main body 32 that is detected by the door-state detection device 36, but this will be described later.

Next will be described a specific configuration of the ramp-state detection device 28 with reference to FIG. 4. As described above, the ramp main body 22 advances or retracts in response to the driving of the motor 26. The ramp-state detection device 28 includes a rotation number sensor 60, a current sensor 62, and a position switch 64 so as to detect the state of the ramp main body 22.

The rotation number sensor 60 is configured to detect a rotation number Ns and a rotation direction of the motor 26 and is, for example, an encoder. Further, the current sensor 62 detects a current value Is to be applied to the motor 26. Here, the output torque from the motor 26 is generally proportional to the current value Is, and therefore, it can be said that the current value Is is a parameter indicative of the output torque from the motor 26.

Figure 4:
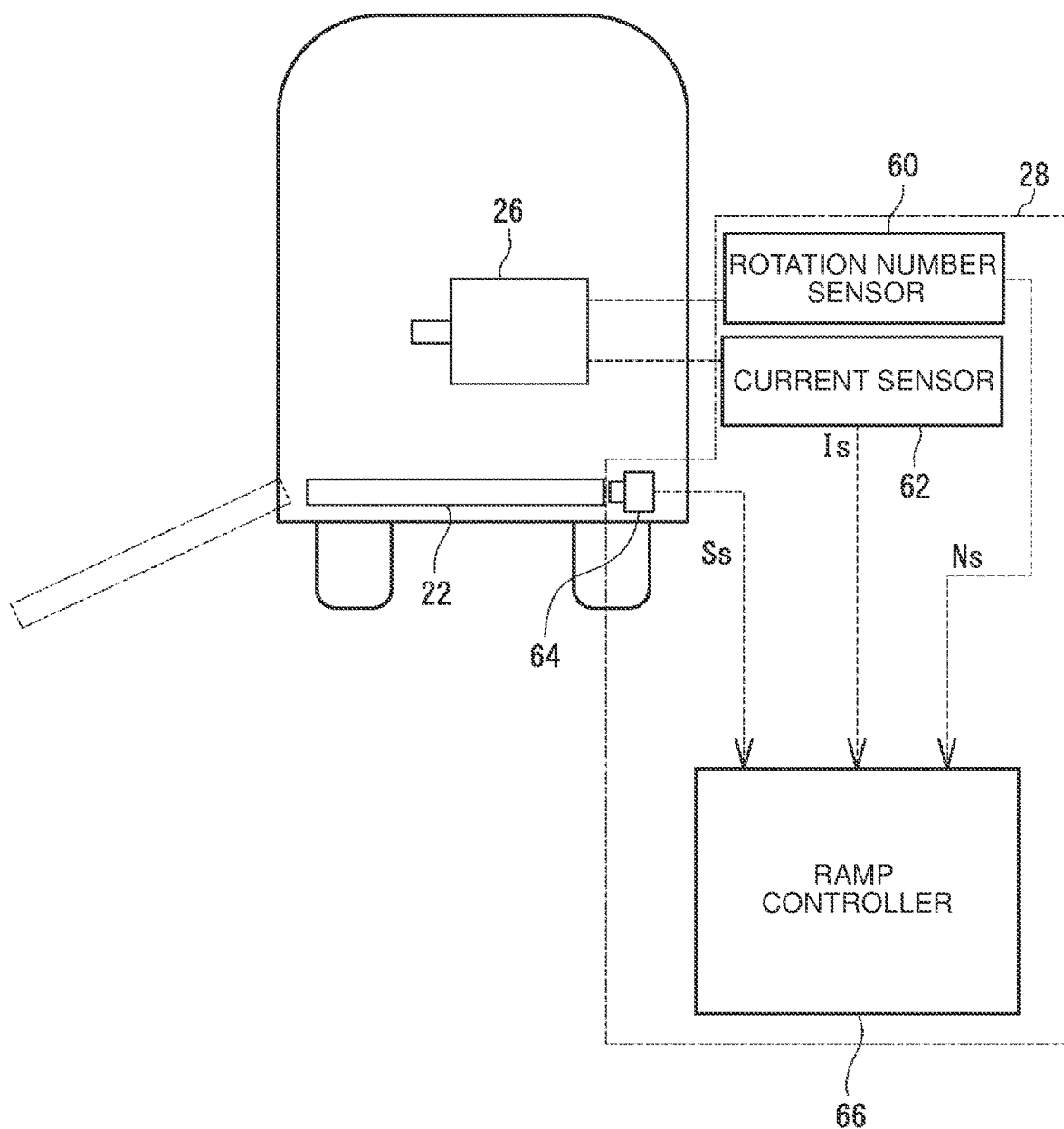
FIG. 4 is a view illustrating a specific configuration of a ramp-state detection device.

Note that, in FIG. 4, only one motor 26 is illustrated, but a plurality of motors 26 may be provided to move the ramp main body 22. Further, in a case where the motors 26 are provided, the same number of rotation number sensors 60 and current sensors 62 as the number of the motors 26 may be provided to detect respective rotation numbers Ns and respective current values Is of the motors 26.

The position switch 64 is a switch configured to detect the ramp main body 22 entering the accommodated state. More specifically, the position switch 64 is a switch configured such that, when the ramp main body 22 completely retracts and enters the accommodated state, the position switch 64 is turned on, and when the ramp main body 22 advances from the accommodated state, the position switch 64 is turned off. The position switch 64 is, for example, a contact switch or a contactless switch configured to be turned on when an object makes contact with the position switch 64 or comes closer to the position switch 64. In this case, the position switch 64 is provided at a position that makes contact with or is placed close to the ramp main body 22 in the accommodated state. A switch signal Ss indicative of an ON-OFF state of the position switch 64 is transmitted to a ramp controller 66.

The ramp controller 66 is a computer including a processor and a memory. The ramp controller 66 controls driving of the motor 26 and determines the state of the ramp main body 22 based on a detection result from the rotation number sensor 60, a detection result from the current sensor 62, and a switch signal from the position switch 64, and the ramp controller 66 transmits a determination result to the UI unit 40. More specifically, the ramp controller 66 determines an advancing-retracting amount and an advancing-retracting direction of the ramp main body 22 based on the rotation number Ns and the rotation direction detected by the rotation number sensor 60. Then, based on the advancing-retracting amount and the advancing-retracting direction, the ramp controller 66 determines the advancing-retracting state of the ramp main body 22, that is, which state the ramp main body 22 currently has, the deployed state, the accommodated state, or the transition state.

Further, the ramp controller 66 may determine whether or not the ramp main body 22 has a malfunction. For example, an allowable upper limit for a current value to be applied to the motor 26 when the ramp main body 22 moves normally may be stored in the ramp controller 66 in advance, and the ramp controller 66 may determine whether the ramp main body 22 has a malfunction or not, based on the comparison between the allowable upper limit and the current value Is detected by the current sensor 62. That is, in the course of moving the ramp main body 22, some sort of foreign matter may be caught on the ramp main body 22 or the ramp actuator 24, and abnormal locking in the ramp main body 22 does not move even when the motor 26 is driven may occur. In this case, the output torque from the motor 26 becomes excessive, eventually, an applied current value becomes excessive. Accordingly, in a case where the detected current value Is exceeds the allowable upper limit, the ramp controller 66 may determine that that abnormal locking occurs.

Further, the ramp controller 66 may determine whether the ramp main body 22 has a malfunction or not, based on the comparison between a position of the ramp main body 22 that is estimated from a detection result from the position switch 64 and a position of the ramp main body 22 that is estimated from a detection result from the rotation number sensor 60. That is, in a case where the position switch 64 is not turned even though the ramp main body 22 should reach the accommodated state based on the rotation number Ns, or in a case where the position switch 64 remains turned on even though the ramp main body 22 should be in the transition state or the deployed state based on the rotation number Ns, it can be presumed that either or both of the rotation number sensor 60 and the position switch 64 have an abnormality, and a sensor abnormality in which the state of the ramp main body 22 cannot be accurately detected occurs.

In a case where the sensor abnormality occurs, the ramp actuator 24 cannot control the movement of the ramp main body 22 appropriately, so that a malfunction occurs. In view of this, in a case where the detection result from the position switch 64 is inconsistent with the detection result from the rotation number sensor 60, the ramp controller 66 determines that a malfunction due to the sensor abnormality occurs. The ramp controller 66 transmits the advancing-retracting state of the ramp main body 22 and information on whether the malfunction occurs or not to the UI unit 40 as a detection result. Note that, in the present embodiment, the position switch 64 is provided at a position where the position switch 64 is turned on in the accommodated state. However, the position switch 64 may be provided at other positions, provided that the position switch 64 is turned on when the ramp main body 22 reaches a predetermined position. Further, the number of the position switches 64 is not limited to one, and a plurality of position switches 64 may be provided.

Figure 5:
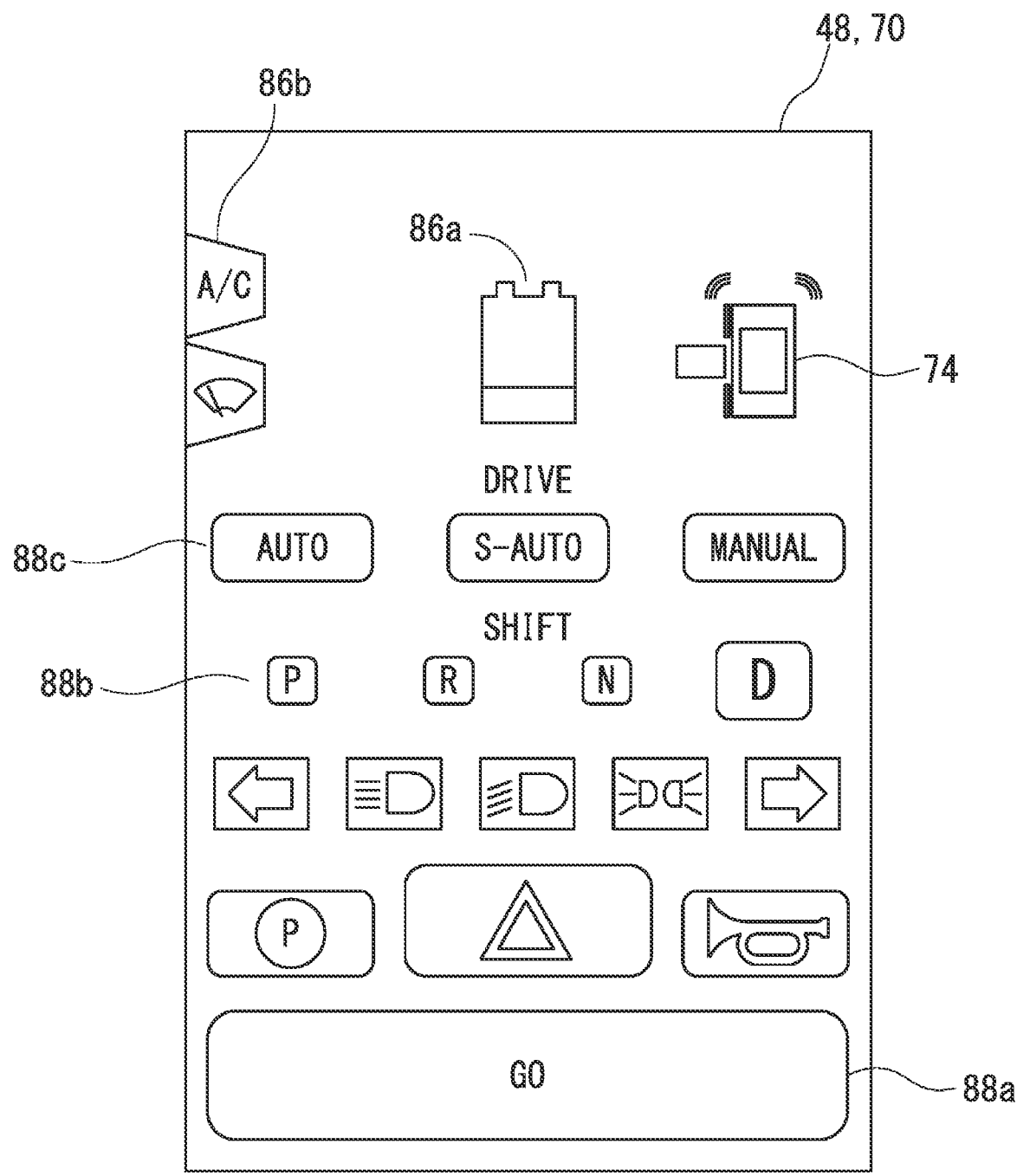
FIG. 5 is a view illustrating one example of an operation screen 70 displayed on a display device.

The UI controller 42 causes the display device 48 to display the state image 74 on which the detection result sent from the ramp-state detection device 28 is reflected. More specifically, the UI controller 42 causes the display device 48 as a touch panel to display the operation screen 70 necessary for the operating control of the vehicle, and the state image 74 is incorporated in the operation screen 70. FIG. 5 is a view illustrating one example of the operation screen 70 displayed on the display device 48 as a touch panel. The operation screen 70 includes an information image indicative of the state of the vehicle and virtual buttons configured to receive a touch-input from the operator. The information image corresponds to, for example, an image 86a indicative of a battery residual amount, an image 86b indicative of an operation state of an air-conditioning device, and so on. Further, the virtual buttons correspond to, for example, a driving start button 88a to instruct a driving start, a range button 88b to select a shift range, a mode button 88c to select a driving mode, and so on. The operation screen 70 further includes the state image 74.

The state image 74 is an image indicative of the state of the ramp main body 22 as described above. The operation screen 70 including the state image 74 is displayed on the display device 48 as described above. The display device 48 is provided at the position observable from the operator seat 16, more specifically, in the operation panel 18, as described repeatedly. On that account, when the operation screen 70 is displayed with the state image 74 being incorporated in the operation screen 70, the operator can grasp the state of the ramp main body 22 while the operator is seated on the operator seat 16. In other words, it is not necessary for the operator to change the direction of the body or to stand and walk to the vicinity of the door opening 12 in order to grasp the state of the ramp main body 22, and thus, it is possible to reduce burdens on the operator.

Further, as described repeatedly, the state image 74 is displayed on the operation screen 70, that is on the same screen as the driving start button 88a and the range button 88b. It can be said that the driving start button 88a and the range button 88b are one type of change button that the operator should operate necessarily when the vehicle is changed from a stop state to a traveling state. By displaying the state image 74 on the same screen as the change buttons, the state image 74 also easily gets in the visual field of the operator when the operator changes the vehicle from the stop state to the traveling state. Hereby, it is possible to more surely prevent lack of check, that is, it is possible to more surely prevent the operator from start to move the vehicle without checking the state of the ramp main body 22.

Figure 6:
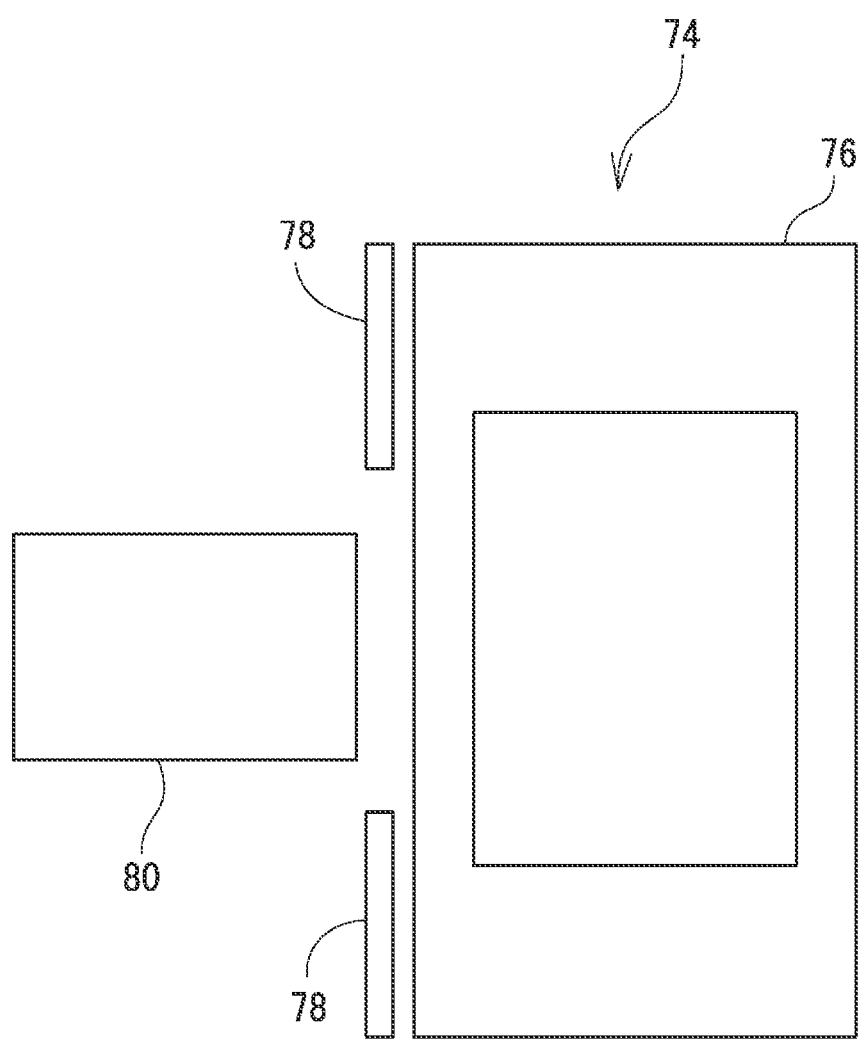
FIG. 6 is a view illustrating one example of a state image when a door main body is fully opened and a ramp main body is in a deployed state.

The state image 74 may be an image including schematic views of the vehicle, the ramp main body 22, and the door main body 32. FIGS. 6 to 10 are views illustrating examples of the state image 74. As illustrated in FIG. 6, the state image 74 includes a vehicle schematic view 76 that is a schematic view of the vehicle viewed from right above the vehicle, door schematic views 78 that are schematic views illustrating the door main body 32 viewed from right above the door main body 32, and a ramp schematic view 80 that is a schematic view of the ramp main body 22 viewed from right above the ramp main body 22. The door schematic views 78 and the ramp schematic view 80 change in the state image 74 in accordance with the opening-closing state of the door main body 32 and the advancing-retracting state of the ramp main body 22. With such a configuration, the operator can grasp the states of the ramp main body 22 and the door main body 32 intuitively in a short time.

Figure 7:
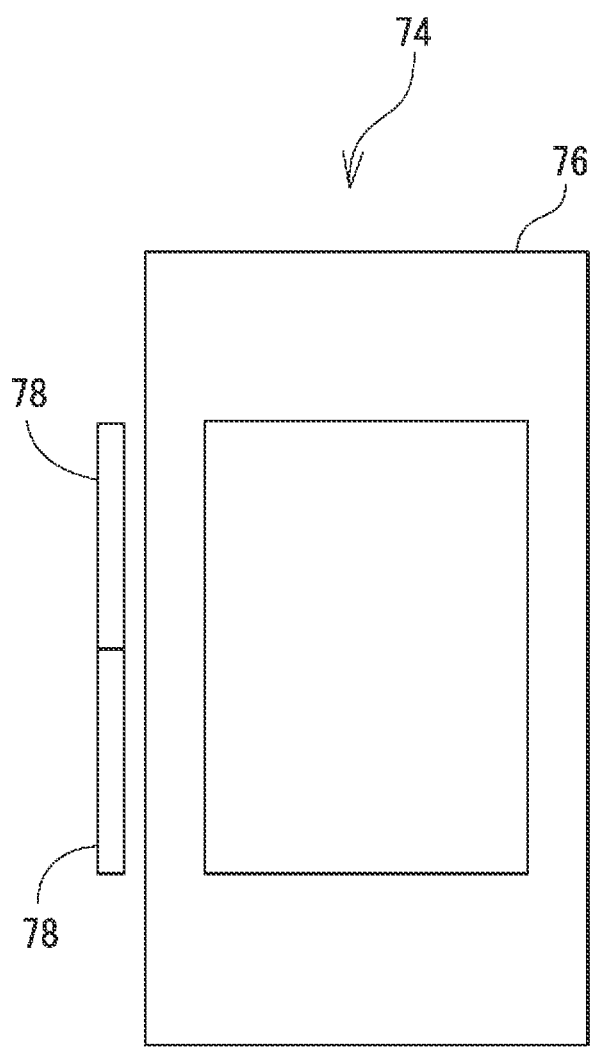
FIG. 7 is a view illustrating one example of a state image when the door main body is fully closed and the ramp main body is in an accommodated state.
Figure 8:
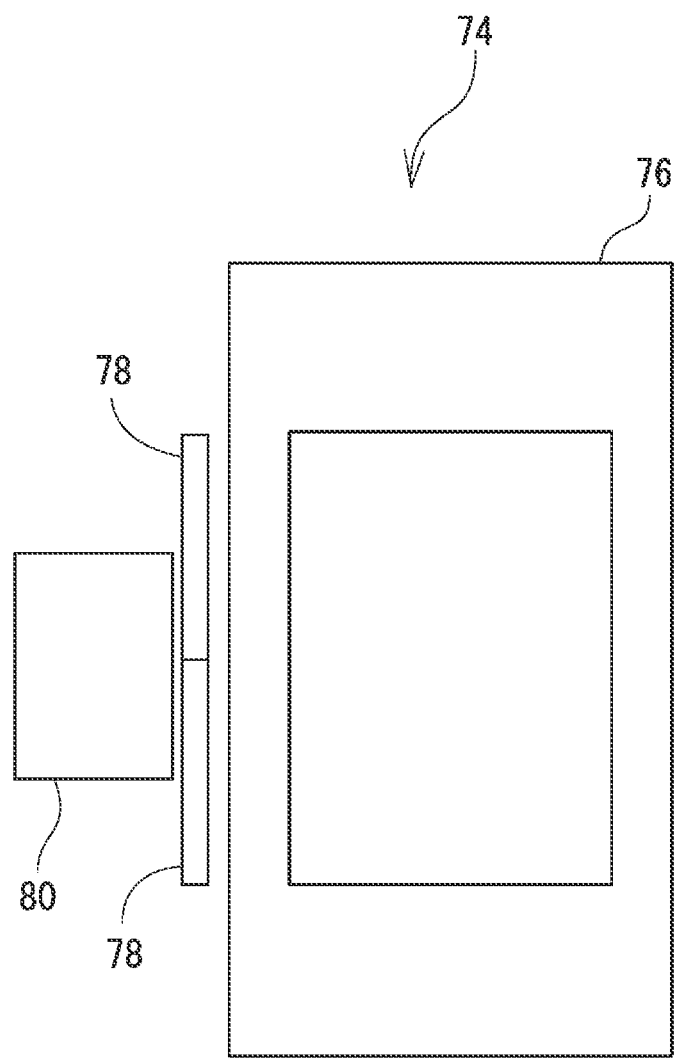
FIG. 8 is a view illustrating one example of a state image when the door main body is fully closed and the ramp main body is in a transition state.

The ramp schematic view 80 may change in shape in accordance with the advancing-retracting amount of the ramp main body 22. Accordingly, in a case where the ramp main body 22 is in the deployed state, the right-left dimension of the ramp schematic view 80 may be maximum as illustrated in FIG. 6. In a case where the ramp main body 22 is in the accommodated state, the ramp schematic view 80 may not be displayed as illustrated in FIG. 7. In a case where the ramp main body 22 is in the transition state, the right-left dimension of the ramp schematic view 80 may change in accordance with the advancing-retracting amount as illustrated in FIG. 8.

Further, as another modification, instead of or in addition to the shape of the ramp schematic view 80, at least one of the color and the display time of the ramp schematic view 80 may be changed in accordance with the advancing-retracting state of the ramp main body 22. For example, in a case where the ramp main body 22 is in the deployed state, the ramp schematic view 80 may be continuously displayed with a first color, and in a case where the ramp main body 22 is in the accommodated state, the ramp schematic view 80 may not be displayed. Further, in a case where the ramp main body 22 is in the transition state, the ramp schematic view 80 may be displayed blinkingly or may be displayed with a second color different from the first color.

In a case where at least one of the color and the display time of the ramp schematic view 80 is changed in accordance with the advancing-retracting state of the ramp main body 22 as such, the deployed state and the transition state can be easily distinguished from each other in comparison with a case where only the shape of the ramp schematic view 80 is changed.

Further, the display positions of the door schematic views 78 may change in accordance with the opening-closing amount of the door main body 32. Accordingly, in a case where the door main body 32 is fully opened, the paired door schematic views 78 may be displayed such that the door schematic views 78 are placed at positions separated from each other in the up-down direction as illustrated in FIG. 6. In a case where the door main body 32 is fully closed, the paired door schematic views 78 may be displayed such that the door schematic views 78 are placed at positions making contact with each other as illustrated in FIG. 7. When the door schematic views 78 indicative of the state of the door main body 32 are also displayed as such, the operator can also easily and surely grasp the state of the door main body 32.

Figure 9:
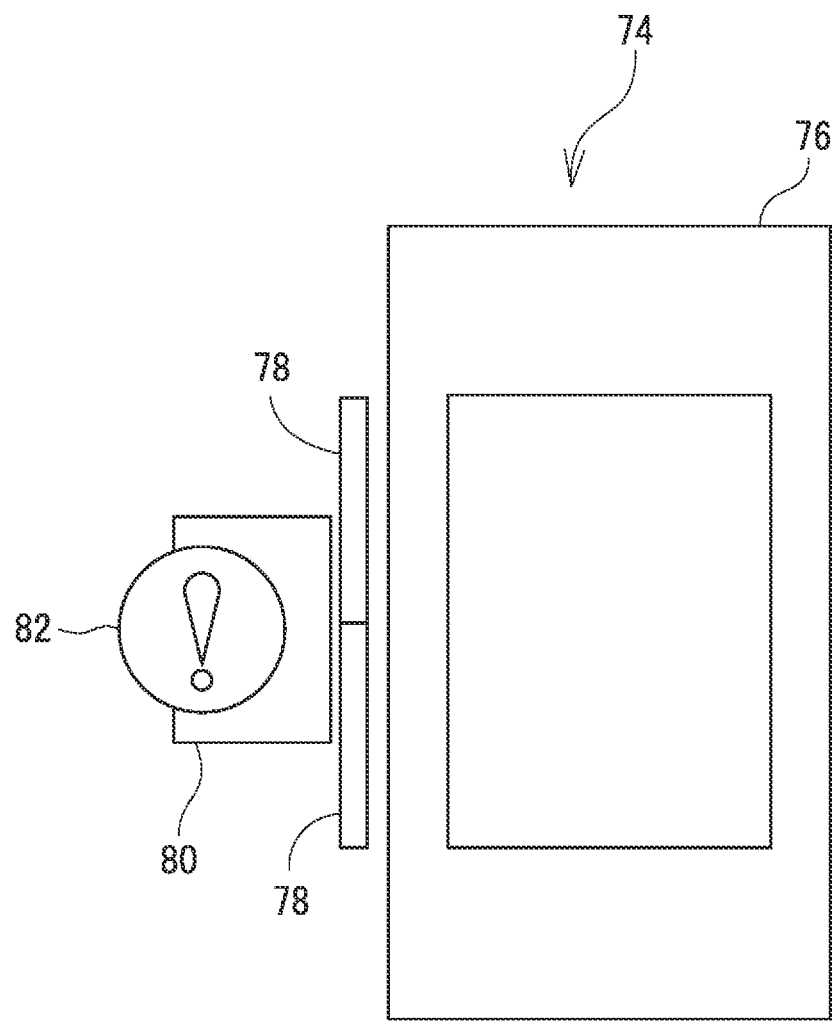
FIG. 9 is a view illustrating one example of a state image 74 including a caution mark 82.

Further, in a case where the ramp main body 22 has a malfunction, the state image 74 may include a caution mark 82. That is, in a case where the malfunction of the ramp main body 22 is detected by the ramp-state detection device 28, the UI controller 42 displays the caution mark 82 in addition to the vehicle schematic view 76 and so on. FIG. 9 is a view illustrating one example of the state image 74 including the caution mark 82. In this case, the caution mark 82 is displayed to be superposed with the ramp schematic view 80. By displaying such a caution mark 82, the operator can grasp the occurrence of the malfunction of the ramp main body 22 at an early stage.

Further, while the state image 74 is being displayed, warning beep corresponding to the state of the ramp main body 22 may be output. For example, in a case where the ramp main body 22 is in the transition state, the UI controller 42 may output, from the speaker 50, a first sound (e.g., intermittent electric sound or the like) indicating that the ramp main body 22 is moving. Further, in a case where the ramp main body 22 has a malfunction, the UI controller 42 may output, from the speaker 50, a second sound (e.g., warning buzzer or the like) for alerting. When the state of the ramp main body 22 is notified audibly as well as visually as such, the operator can more surely grasp the state of the ramp main body 22.

In the meantime, as described above, the vehicle is provided with the ramp switch 29 configured to instruct accommodation or deployment of the ramp main body 22. The ramp switch 29 is provide in the vicinity of the door opening 12, and a passenger can operate the ramp switch 29 as needed. In other words, by providing the ramp switch 29, the passenger can change the state of the ramp main body 22 freely. However, under a specific condition, the ramp switch 29 is requested to be invalidated. For example, during traveling of the vehicle, it is undesirable for the ramp main body 22 to start to move. In view of this, after the vehicle is ready to start to travel, the ramp unit 20 may invalidate the ramp switch 29 during a period before the vehicle stops. With such a configuration, even when the passenger touches the ramp switch 29 by mistake after the vehicle is ready to start to travel, it is possible to prevent the ramp main body 22 from starting to move.

Figure 10:
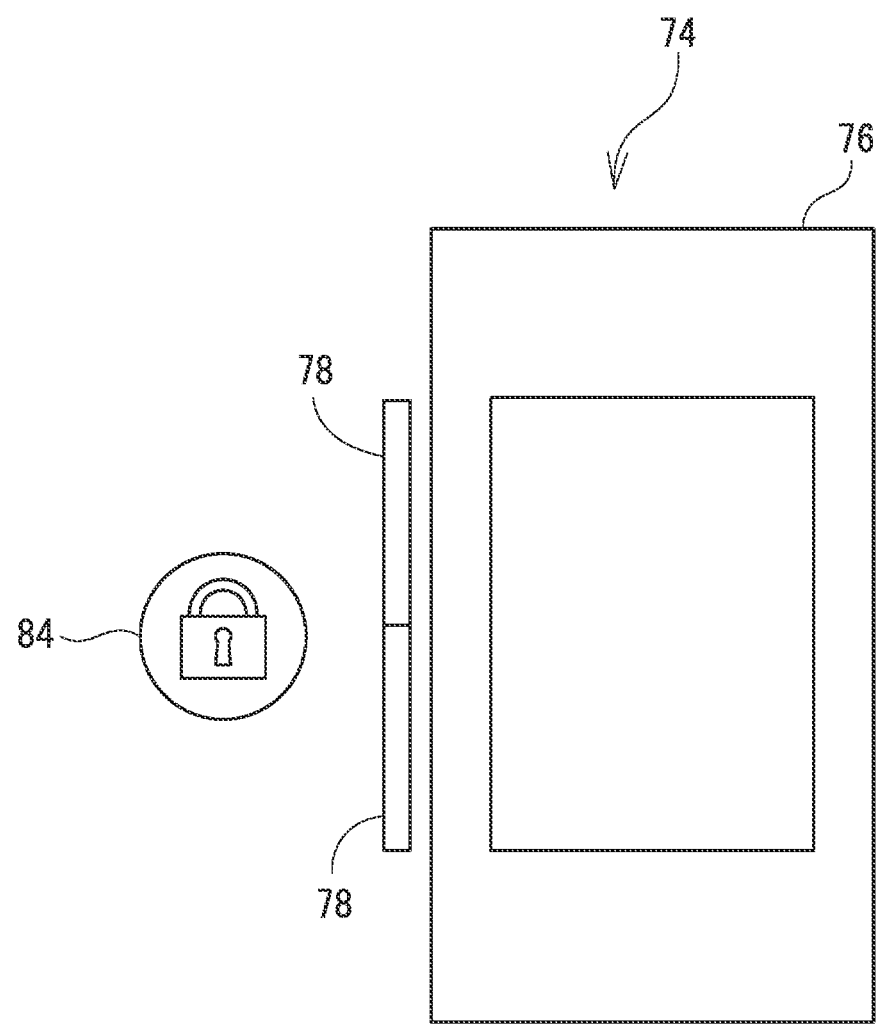
FIG. 10 is a view illustrating one example of the state image 74 including an invalidation mark 84.

Further, in a case where the ramp switch 29 is invalidated, the state image 74 may include an invalidation mark 84 indicating that the ramp switch 29 is invalidated. FIG. 10 is a view illustrating one example of the state image 74 including the invalidation mark 84. When the invalidation mark 84 is displayed as part of the state image 74, the operator can also easily grasp the state of the ramp switch 29. While the invalidation mark 84 is being displayed, the ramp main body 22 is prevented from starting to move against the will of the operator. Accordingly, the operator can perform other operations at ease.

As apparent from the above description, in the ramp system 10 described herein, the state image 74 indicative of the state of the ramp main body 22 is displayed on the display device 48 observable from the operator seat 16. As a result, the operator can easily and surely grasp the state of the ramp main body 22. Note that the above description is one example, and the configurations can be changed appropriately, provided that the state image 74 including an image indicative of the advancing-retracting state of the ramp main body 22 is displayed in a display area observable from the operator seat 16. For example, in the above description, the state image 74 includes an illustration image (schematic view) indicative of the state of the ramp main body 22, but the state image 74 may include a text image indicative of the state of the ramp main body 22 instead of the illustration image.

Further, in the above description, in addition to the image indicative of the advancing-retracting state of the ramp main body 22, the state image 74 includes the image indicative of the opening-closing state of the door main body 32 and the image indicative of whether the ramp main body 22 has a malfunction or not. However, these images may be omitted. Further, the state image 74 may be displayed on a screen separate from the change buttons (that is, the driving start button 88a, the range button 88b, and so on). Further, in the above description, the state image 74 is displayed only on the operation screen 70 visually recognized by the operator, but the state image 74 may be also displayed in other parts. For example, a second display device may be provided in the door main body 32, and the state image 74 may be displayed on the second display device. With such a configuration, the passenger as well as the operator can also surely grasp the state of the ramp main body 22.

What is claimed is:

1. A ramp system comprising:
a ramp main body provided in a door opening and configured to advance from a vehicle floor toward a road surface;
a ramp-state detection device configured to detect an advancing-retracting state of the ramp main body and to detect presence or absence of a malfunction in the ramp main body;
a display device configured to display an image in a display area observable from an operator seat; and
a user interface (UI) controller configured to control display on the display device, the UI controller causes the display device to display a state image including an image indicative of the advancing-retracting state and, when the malfunction occurs, causes the display device to display the state image including a warning image indicating that the malfunction occurs, wherein
the ramp-state detection device includes,
a rotation number sensor configured to detect a rotation number of a ramp motor as a power source configured to advance and retract the ramp main body,
a current sensor configured to detect an applied current value in the ramp motor, and
a position switch configured to detect the ramp main body reaching a predetermined position, and
the ramp-state detection device determines whether the malfunction occurs in the ramp main body or not, based on a detection value from the current sensor and a comparison result obtained by comparison between a position of the ramp main body that is estimated from an ON-OFF state of the position switch and a position of the ramp main body that is estimated from the rotation number.

2. The ramp system according to claim 1, wherein the UI controller causes the state image to be displayed on the same screen as a change button to be selected by an operator when a vehicle is changed from a stop state to a traveling state.

3. The ramp system according to claim 1, further comprising a door-state detection device configured to detect an opening-closing state of a door main body configured to be able to be opened and closed to cover the door opening, wherein the state image further includes an image indicative of the opening-closing state.

4. The ramp system according to claim 3, wherein the state image includes respective schematic views of the vehicle, the ramp main body, and the door main body viewed from an upper side.

5. The ramp system according to claim 1, further comprising a ramp switch provided at a position closer to the door opening than the operator seat, the ramp switch being configured to receive an instruction of deployment or accommodation of the ramp main body and to be invalidated under a specific condition, wherein, in a case where the ramp switch is invalidated, the state image includes an invalidation image indicating that the ramp switch is invalidated.

6. The ramp system according to claim 1, further comprising a speaker configured to output sound toward the operator seat, wherein the UI controller outputs sound corresponding to the ramp state from the speaker while the state image is being displayed.

\* \* \* \* \*